United States Patent [19]

Ryuu

[11] Patent Number: 5,794,749
[45] Date of Patent: Aug. 18, 1998

[54] TEMPERATURE-RESPONSIVE FLUID-TYPE FAN COUPLING APPARATUS

[75] Inventor: Hideo Ryuu, Nogata-gun, Japan

[73] Assignee: Usui Kokusai Sangyo Kaisha Limited, Japan

[21] Appl. No.: 721,574

[22] Filed: Sep. 25, 1996

[51] Int. Cl.$^6$ .................................................. F16D 35/02
[52] U.S. Cl. ........................ 192/58.681; 192/58.8; 192/82 T; 251/75; 137/79
[58] Field of Search ................ 192/58.681, 58.8, 192/58.68, 58.63, 82 T; 251/75; 137/79

[56] References Cited

U.S. PATENT DOCUMENTS

| | | | |
|---|---|---|---|
| 2,074,526 | 3/1937 | Williams | 251/75 X |
| 2,606,543 | 8/1952 | Rappl | 251/75 X |
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,135,370 | 6/1964 | Sutton | 192/58.68 |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,339,688 | 9/1967 | Harvey | 192/58.681 |
| 3,430,743 | 3/1969 | Fujita et al. | 192/58 B |
| 3,463,282 | 8/1969 | Fujita et al. | 192/58 B |
| 3,642,105 | 2/1972 | Kikuchi | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,893,555 | 7/1975 | Elmer | 123/41.12 |
| 3,964,582 | 6/1976 | Mitchell | 192/58 B |
| 4,036,339 | 7/1977 | Kikuchi | 192/58.68 X |
| 4,060,158 | 11/1977 | Kikuchi | 192/82 T |
| 4,062,432 | 12/1977 | Evans | 192/58.681 |
| 4,086,987 | 5/1978 | Riley et al. | 192/58.68 |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |

(List continued on next page.)

FOREIGN PATENT DOCUMENTS

| | | | |
|---|---|---|---|
| 55-76226 | 6/1980 | Japan. | |
| 57-1829 | 1/1982 | Japan | 192/82 T |
| 57-167533 | 10/1982 | Japan. | |
| 57-179431 | 11/1982 | Japan. | |
| 62-124330 | 6/1987 | Japan. | |
| 62-194038 | 8/1987 | Japan | 192/58 B |

*Primary Examiner*—Charles A. Marmor
*Assistant Examiner*—Scott Lund
*Attorney, Agent, or Firm*—Anthony J. Casella; Gerald E. Hespos; Ludomir A. Budzyn

[57] ABSTRACT

A temperature-responsive fluid-type fan coupling has a sealing casing with a partition plate disposed therein. The partition plate divides interior portions of the casing into an oil reservoir chamber and a torque transmission chamber. A port extends through the partition plate to provide communication between the chambers. The casing is rotatably mounted around a rotary shaft such that an end of the shaft is disposed in the torque transmission chamber. A drive disc is fixedly mounted to the shaft and is disposed in the torque transmission chamber. Fluid in the torque transmission chamber functions to transmit torque from the disc to the casing. The valve member has one end mounted to the partition plate and an opposed end movably positioned in proximity to the port through the partition plate. Intermediate portions of the valve member are engaged by a pin, which in turn is movable in response to a temperature-responsive member. The valve member is biased to instantaneously open and close at set temperatures.

4 Claims, 3 Drawing Sheets

U.S. PATENT DOCUMENTS

| | | | |
|---|---|---|---|
| 5,004,085 | 4/1991 | Taureg | 192/58 B |
| 5,018,612 | 5/1991 | Takikawa et al. | 192/58 B |
| 5,060,774 | 10/1991 | Takikawa et al. | 192/58 A |
| 5,090,533 | 2/1992 | Inoue | 192/58 B |
| 5,101,949 | 4/1992 | Takikawa et al. | 192/58 B |
| 5,109,965 | 5/1992 | Inoue | 192/58 B |
| 5,119,920 | 6/1992 | Inoue | 192/58 B |
| 5,125,491 | 6/1992 | Takikawa et al. | 192/58 B |
| 5,139,125 | 8/1992 | Takikawa et al. | 192/58 B |
| 5,232,074 | 8/1993 | Watanabe | 192/58 B |
| 5,263,563 | 11/1993 | Martin | 192/58.681 X |
| 5,452,782 | 9/1995 | Inoue . | |
| 5,501,183 | 3/1996 | Takayama . | |

PRIOR ART

TEMPERATURE-RESPONSIVE FLUID-TYPE FAN COUPLING APPARATUS

BACKGROUND OF THE INVENTION

1. Field of the Invention

This invention relates generally to an improvement in a temperature-responsive fluid-type fan coupling apparatus which performs automatic control on rotation of an engine-cooling fan in dependence upon change of temperature externally surrounding the same, in order to continuously supply cooling air to the engine in an amount commensurate with a running state thereof.

2. Description of the Prior Art

Conventionally, there has been utilized, as a fan coupling apparatus of this kind, an apparatus having an essential part, which is exemplified by a sectional view in FIG. 5.

This apparatus has a rotary shaft 2 having a drive disc 1 in a discoid form firmly fixed on a tip end portion thereof, and a sealing casing 7 which is comprised of a case 5 supported via a bearing 3 on the rotary shaft 2 to have a cooling fan member attached to a peripheral portion thereof, and a cover 6.

The interior of the sealing casing 7 is divided, by a partition plate 9 formed with a supply-adjusting port 8 for a thermostable synthetic oil, with an oil reservoir chamber 10 and a torque transmitting chamber 11 accommodating therein the drive disc 1. In the interior of the oil reservoir chamber 10, a valve member 14 in a sheet form is further accommodated to be interlocked with a connecting pin 13. The connecting pin 13 is arranged displaceable in an axial direction to follow the change of temperature sensed by a temperature-responsive member 12 provided in front of the cover 6. The sheet valve member 14 has one end thereof riveted onto the partition plate 9 on an oil reservoir chamber 10 side thereof, and the other free end adapted for opening and closing the supply-control port 8.

With such arrangement, the supply-adjusting port 8 is opened and closed by the actuation of the valve member 14 in a manner of increasing and decreasing the amount of a thermostable synthetic oil present in the transmitting chamber 11, providing control on the torque transmitted from the rotary shaft 2 as a driving side to the sealing casing 7 as a driven side.

Further, a dam 16 is provided in a part of an inner peripheral wall of the sealing casing 7, together with an outlet port provided at a location close to and immediately before the dam with respect to a direction of rotation. The oil, which is pumped out of the torque-transmitting chamber 11 through the dam 16, flows by way of the outlet port and an outlet-circulating passage 17 in communication therewith, to be restored by the oil reservoir chamber 10.

Also, the sealing casing 7 has a heat-dissipating fin 24 formed on the exterior side thereof.

With the fan coupling apparatus constructed as above, when the external temperature surrounding the same exceeds a set value, the valve member 14 provided in contact with the connecting pin 13 becomes to release the supply-adjusting port 8 of the partition member 9, due to the actuation of the connecting pin 13 caused by deformation of the temperature-responsive member 12.

On the other hand, when the externally surrounding temperature falls below the set value, the valve member 14 inversely actuates to close the supply-adjusting port 8.

The operation as above causes increase and decrease in effective contact area for the thermostable synthetic oil present in the torque transmitting chamber 11 provided between the driving disc 1 and the sealing casing 7. This makes possible control on the magnitude of torque transmitted from the driving rotary shaft 2 to the driven sealing casing 7.

In such conventional fan coupling apparatus, the supply of oil from the oil reservoir chamber 10 into the torque transmitting chamber 11 is carried out by a mechanism in which the valve member 14 is opened and closed in accordance with the temperature sensed by the temperature-responsive member. As a consequence, the oil supply is controlled such that the amount thereof is in proportion to the opening degree of the valve, i.e., in proportion to the square of the fan rotation. On the other hand, the restoration of oil is made through the dam provided in the torque transmitting chamber. With such mechanism, the amount of oil restored varies in proportion to the difference of rotation between the input shaft and the fan following thereto. On the other hand, the valve member, formed of a spring material, is assembled open as a single member so that it is assembled in a compressed state being closed by the spring force of the temperature-responsive member acting thereon via the connecting lever. This spring force decreases with increase of temperature sensed by the temperature-responsive member, so that the valve is gradually opened by such a degree that the reacting force of the valve member surpasses. The rotation of the fan begins increasing at such a temperature that the amount of oil supply becomes greater somewhat than the amount of restore of the same. Also, the amount of oil supply acceleratingly increase, promptly establishing a state of connection. The temperature at this time is a set temperature for connection, which is standing in a delicate equilibrium in amount of oil of between restored and supplied. This set temperature is mechanically adjustable by determining the length of the connecting lever.

Accordingly, in the conventional fan coupling apparatus, all deviations in tolerance resulting from manufacturing processes and assembling are gathered onto the connecting lever, and reflected as variations of set temperatures. To cope with this, the connecting lever is practically controlled of its length by conducting test operation after assembly of the cooling fan and the coupling, for confirmation of the set temperature. However, there has been a demand of improvement on such operation, because of the operation is troublesome and time-consuming, requiring excessive accuracy.

Also, the conventional fan coupling apparatus is provided in an engine room, and, in addition, the viscous thermostable synthetic oil serving as a coupler undergoes action of shear, while the cooling fan is being driven. This results in raising of the self-calorific value of the thermostable synthetic oil circulating in the sealing casing, or going into imbalance between heat generation and heat dissipation, as the structure of the sealing casing may be.

Further, it is often recognized that the temperature change as mentioned above takes place suddenly. However, the conventional fan coupling apparatus employs a mechanism in which the opening and closing is made gradually by the valve member based on the temperature sensed by the temperature-responsive section. Accordingly, there has been a difficulty of instantaneously opening and closing the supply-adjusting port to promptly control the rotation of the cooling fan, in accordance with the abrupt temperature change.

There is therefore a possibility that the above various factors in complex cause degradation of a thermostable synthetic oil and hence bearings to thereby impede stable driving of the cooling fan, causing damages to the apparatus.

SUMMARY OF THE INVENTION

The present invention has been made in view of various difficulties raised by the conventional arts.

It is therefore an object of the present invention to provide a temperature-responsive fluid-type fan coupling apparatus which makes possible simple setting of the temperature due to no requirement for delicate opening for the valve.

It is another object to enabling confirmation of the set temperature by such a simple method that a cover member is partly assembled and a temperature-responsive member is submerged in an oil kept at a set temperature, instead of confirming the set temperature in an operation after assembling the cooling fan and the coupling together.

It is further object to enabling prompt adjusting the rotation of the cooling fan so as to cope with abrupt temperature change.

In order to solve the above problem, the present invention is characterized by a temperature-responsive fluid-type fan coupling apparatus comprising:

- a rotary shaft having a drive disc in a discoid form firmly fixed at a tip end portion thereof;
- a sealing casing formed by a case and a cover to have a cooling fan member on an outer peripheral portion thereof;
- a partition plate having a supply-adjusting port for a thermostable synthetic oil, the partition plate dividing an interior of the sealing casing into an oil reservoir chamber and a torque transmitting chamber accommodating therein the drive disc;
- a valve member provided in the oil reservoir chamber so that the valve member is fixed at one end thereof to the partition plate on an oil reservoir chamber side, the valve member being displaceable through a connecting pin in a manner following deformation of a temperature-responsive member due to change of temperature sensed by said temperature-responsive member provided in front of the cover;
- wherein the amount of oil within the torque transmitting chamber, provided between the drive disc, the case, and the partition plate, is increased and decreased by the actuation of the valve member, to thereby perform control on transmission of rotational torque from the rotary shaft as a driving side to the sealing casing as a driven side; and
- wherein the valve member is constructed such that the supply-adjusting port can be instantaneously opened and closed at a set temperature by a valve means.

Preferably, in the present invention, the valve member is formed by a link member having at least two bent portions formed therein, at least two coiled springs disposed on both sides of the link member in a manner sandwiching the same, a resilient member interposed between the link member and the partition plate on a side opposite to the connecting lever contacting with the link member for urging the link member toward the temperature-responsive member.

More preferably, the valve member is formed by a dish spring in a discoid form, and a resilient member interposed between the dish spring and the partition plate on a side opposite to the connecting lever contacting with the dish spring so as to urge the dish spring toward the temperature-responsive member.

Further preferably, the resilient member is formed by a coiled spring.

Still further preferably, a stop is provided in an inner surface of the cover projecting toward the partition plate in a manner opposed to a free end of the valve member, for restricting the opening to such a degree that the valve exceeds a required opening at which the valve is fully opened.

DETAILED DESCRIPTION OF PREFERRED EMBODIMENTS

Figure 1:
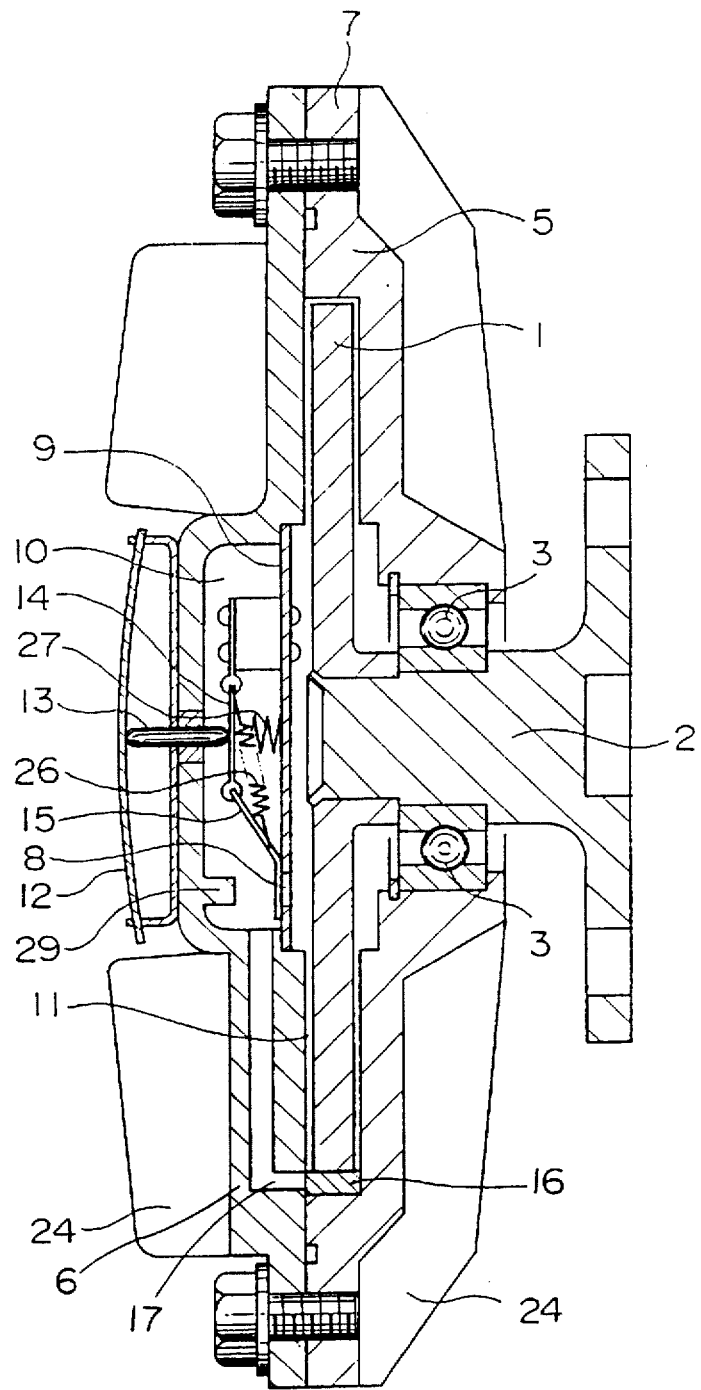
FIG. 1 shows one embodiment of the present invention, which is a longitudinal sectional-view where a valve member is in a close position.

The present invention is described in detail by referring to the drawings.

The present invention, as shown in FIG. 1, is comprised of a temperature-responsive fluid coupling apparatus having a drive disc 1 in a discoid form firmly fixed on a rotary shaft 2, a case 5 supported via bearings 3 on the rotary shaft 2 to have a cooling-fan member attached to a peripheral portion thereof, a sealing casing 7 formed by the case 5 and a cover 6.

The interior of the sealing casing 7 is divided, by a partition plate 9 having a port 8 for adjusting the supply of a thermostable synthetic oil, with an oil reservoir chamber 10 and a torque-transmitting chamber 11 accommodating the drive disc 1. Further, the oil reservoir chamber 10 has a connecting pin 13 arranged axially displaceable so as to follow deformation caused by change of temperature sensed by a temperature-responsive member 12 provided in the front of the cover 6, and a valve member 14 responsive to the displacement of the connecting pin 13.

Figure 2:
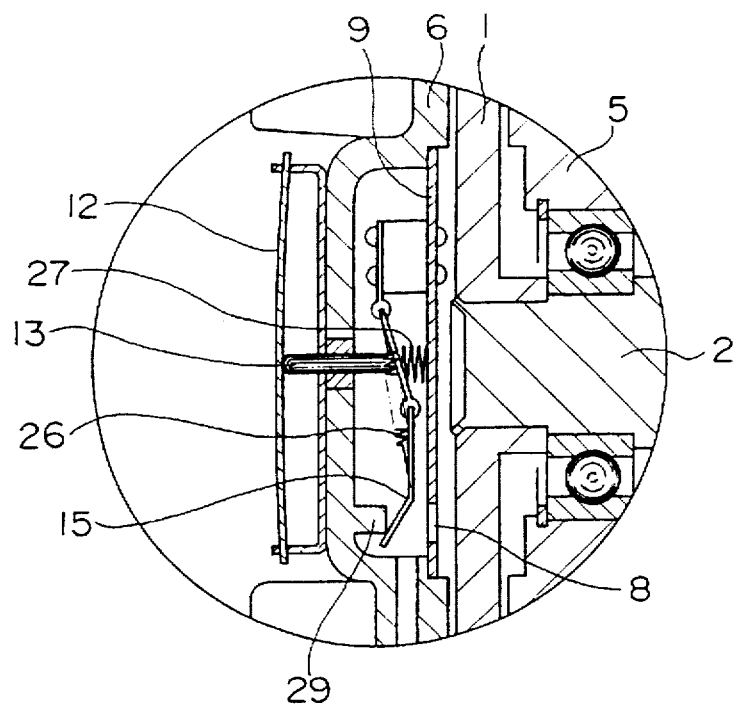
FIG. 2 is a longitudinal partial sectional view where the valve member is in a released position.

The valve member 14 is configured to immediately open and close the supply-adjusting port 8. The valve member 14, as exemplarily shown in FIG. 2, has a link member 15 formed with at least two bent portions, at least two coiled springs 26 disposed right and left in a manner sandwiching the link member 15, and a resilient member 27, e.g., a coiled spring, interposed between the link member 15 and the partition plate 9 on the opposite side of the link member 15 to the connecting pin 13 contacting therewith, so as to urge the link member 15 toward the temperature-responsive member 12.

The partition plate 9 has on an oil reservoir chamber 10 side a link member 15 having a fixed piece 31 at one end riveted thereon for constituting the valve member 14. The link member 15 also has a valve piece 32 at the other free end thereof which is opposed to the supply-adjusting port 8 of the partition plate 9, enabling opening and closing the supply-adjusting port 8. A pressing piece 33 is interposed between the fixed piece 31 and the valve piece 32, giving link structures with rotating axes 34, 34' respectively between the fixed piece 31 and the pressing piece 33 as well as the pressing piece 33 and the valve piece 32.

With such structure, the supply-adjusting port 8 is freely opened and closed by the actuation of the link member 15 provided opposed thereto for constituting the valve member 14. The opening and closing of the supply-adjusting port 8 causes increase or decrease of the amount of a thermostable synthetic oil present within the torque-transmitting chamber 11. The amount of increase or decrease of the oil within the torque-transmitting chamber 11 makes possible control of torque transmitted from the rotary shaft 2 as a driving side to the sealing casing 7 as a driven side.

Further, a dam 16 is provided in a part of an inner peripheral wall of the sealing casing 7, together with a outlet port formed at a location close to and immediately before the dam with respect to a direction of rotation. The oil, which is pumped out of the torque-transmitting chamber 11 by the dam 16, flows by way of the outlet port and a drain-circulating passage 17 communicating therewith, to be restored by the oil reservoir chamber 10.

The sealing casing 7 has a heat-dissipating fin 24 formed on the exterior side thereof.

With the fan coupling apparatus of the present invention constructed as above, when the temperature externally surrounding the same lowers, the temperature-responsive member 12 is deformed to be curved, thereby displacing the connecting pin 13 axially outward by the force of the resilient member 27. On this occasion, the pressing piece 33 is also displaced axially outward by the resilient member 27 in a manner following the displacement of the connecting pin 13. However, an attractive force acts on between the fixed piece 31 and the valve piece 32. As a result, the valve piece 32 remains in the position of FIG. 1 wherein the supply-adjusting port 8 is closed. Then, when the externally surrounding temperature rises, the connecting pin 13 is displaced axially inward, so that it presses the pressing piece 33 against the force of the resilient member 27 and the coiled spring 26. As the connecting pin 13 is further moved axially inward to urge stronger the pressing piece 33, the pressing force surpasses the attractive force acting between the fixed piece 31 and the valve 32. As a result, the link member 15 is immediately shifted of position by the coiled spring 26 from an L form as in FIG. 1 into a reversed-L form as in FIG. 3, instantaneously opening the supply-adjusting port 8.

In the meantime, the link member 15, which is held in the reversed-L form by the coiled spring 26, is depressed at its pressing piece 33 by the resilient member 27, as the connecting pin 13 is displaced due to lowering of the externally surrounding temperature. Thus, the valve piece 32 is placed into contact with the inner surface of the oil reservoir chamber 10. As the connecting pin 13 is further displaced toward the axially outward and the pressing force of the resilient member 27 increases, the pressing force surpasses the attractive force acting between the fixed piece 31 and the valve 32. To this end, the link member 15 is promptly shifted by the coiled spring 26 from the reversed-L form into the inverted L-form, instantaneously closing the supply-adjusting port 8.

This instantaneous opening and closing of the supply-adjusting port 8 by the valve member 14 can be carried out at a predetermined temperature, by appropriately selecting the spring constant of the coiled spring 26 and the spring as the resilient member 27, taking the temperature into consideration.

Figure 3:
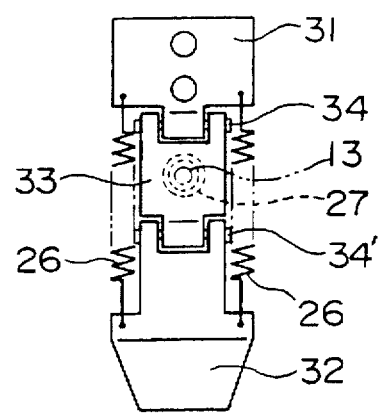
FIG. 3 is a plan view of a valve member to be used in the embodiment of the present invention.
Figure 4:
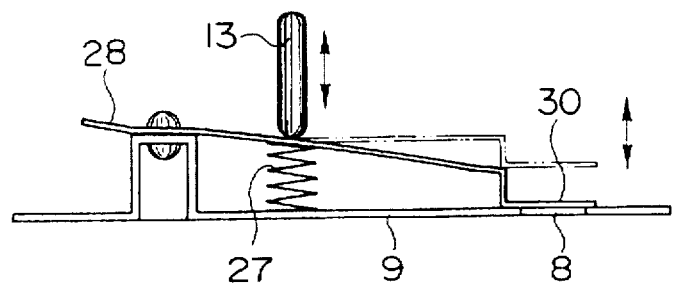
FIG. 4 is a side view of a valve member to be used in another embodiment of the present invention.
Figure 5:
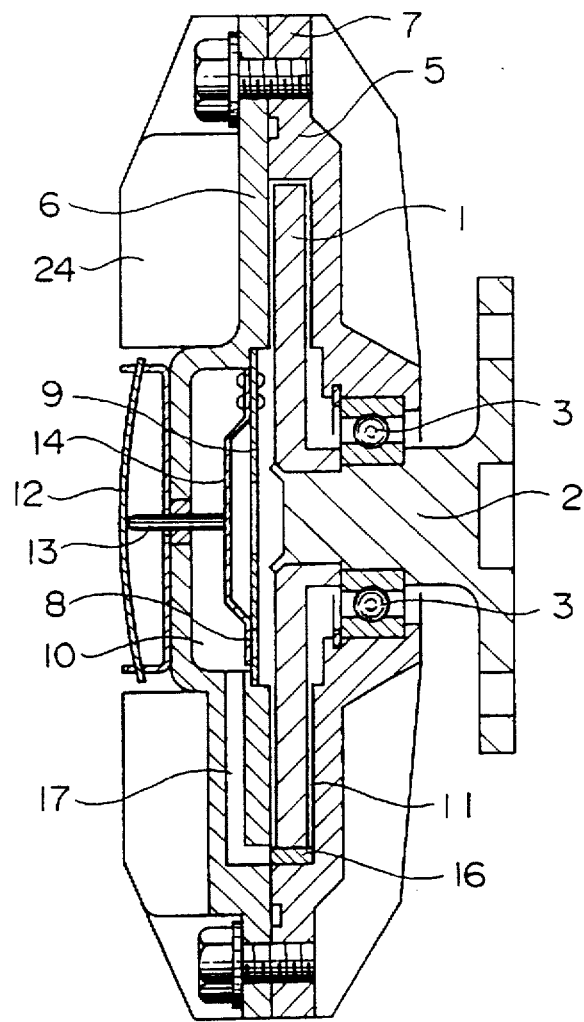
FIG. 5 is a longitudinal sectional view of an example of the conventional art where a valve member is in a closed position.

The valve member 14 may be configured as shown in FIG. 4, besides the embodiment shown in FIGS. 1 and 3. That is, the valve member is formed by a dish spring 28 in a discoid form having a valve piece 30 at a free end thereof, and a resilient member 27 interposed between the dish spring 28 and the partition plate 9 on a side opposed to the connecting pin 13 contacting with the dish spring 28 so that the resilient member 27 urges the dish spring toward the temperature responsive member 12. The movement of the connecting pin 13 exceeding a given range will also cause inversion of the structure, in a manner similar to the above embodiment, instantaneously opening and closing the supply-adjusting port 8.

This embodiment can reduce smaller the size of the valve member 14 with the weight lighted, due to the utilization of the dish spring 28.

For practicing the present invention, it is preferred to provide a valve stop 29 projecting from the inner surface of the cover 6 toward the partition plate 9 in order to delimit the valve opening to a required degree at which it exceeds the full opening. This valve stop 29 is provided at a location opposite to the vale piece 32 on the free end of the link member 15 or the valve piece 30 of the dish spring.

This is due to the fact that when operating the valve member 14, the restriction of the opening of the supply-adjusting port 8 within a certain limit makes possible the reduction of hysteresis in functioning the temperature-responsive member 12 for a temperature range required therefor.

Incidentally, in carrying out the present invention, it is also possible to restrict the opening of the supply-adjusting port 8 to a certain limit for reducing the hystresis in functioning the temperature-responsive member 12 for the required temperature range, by utilizing a valve member 14 in which selection is appropriately made for the inverting force of the coiled spring 26 constituting the valve member 14 or the dish spring 28 as well as the force of the resilient member 27 urging the valve member 14 or the dish spring 28 toward the temperature-responsive member.

As stated above, there is no requirement for finely controlling the valve opening in practicing the present invention, facilitating temperature setting. Further, the setting temperature can be confirmed by solely performing such an easy method that the cover member is partly assembled and the temperature-responsive member is submerged in an oil at a setting temperature. Thus, a temperature-responsive fluid-type fan coupling apparatus can be provided, which is reduced in size and weight with rapid and stable temperature-control characteristic, reducing hysteresis against the temperatures required for actuating the temperature-responsive member.

I claim:

1. A temperature-responsive fluid fan coupling apparatus comprising:

a sealing casing having an interior;

a partition plate disposed in said interior of said sealing casing and dividing the interior of said sealing casing into an oil reservoir chamber and a torque transmitting chamber, said partition plate having a supply-adjusting port extending therethrough and providing communication for a thermostable synthetic oil between said oil reservoir chamber and said torque transmitting chamber;

a rotary shaft having a tip end portion extending into said torque transmitting chamber of said sealing casing such that said sealing casing is rotatable relative to said rotary shaft;

a drive disc firmly fixed at said tip end portion of said rotary shaft and disposed in said torque transmitting chamber;

a temperature-responsive member disposed externally of said sealing casing;

a connecting pin connected to said temperature-responsive member and having a portion extending into said oil reservoir chamber of said sealing casing, said connecting pin being movable in response to a change of temperature sensed by said temperature-responsive member;

a valve member provided in said oil reservoir chamber, said valve member having a fixed piece secured to said partition plate and disposed in the oil reservoir chamber, said valve member further having a pressing piece connected to said fixed piece and engaged with said connecting pin such that said pressing piece is displaceable in response to deformation of the temperature-responsive member due to a change of temperature sensed by said temperature-responsive member, said valve member further having a valve piece movably connected to the pressing piece and being bent for selectively covering said supply-adjusting port of said partition plate;

a resilient member interposed between said pressing piece and said partition plate for urging said pressing piece away from said partition plate and against said connecting pin;

at least one spring extending from said fixed piece to said valve piece for urging said valve piece to move relative to said pressing piece and toward said fixed piece;

wherein oil within said torque transmitting chamber, provided between said drive disc, said sealing casing, and said partition plate is increased and decreased by actuation of said valve member to control transmission of rotational torque from said rotary shaft as a driving side to said sealing casing as a driven side; and wherein said valve member, said connecting pin, said resilient member and said at least one spring cooperate such that said supply-adjusting port can be instantaneously opened and closed at a set temperature.

2. A temperature-responsive fluid fan coupling apparatus according to claim 1, wherein a stop is provided on an inner surface of said sealing casing projecting toward said partition plate and opposed to said valve piece of said valve member, for restricting movement of said valve piece to a selected degree.

3. A temperature-responsive fluid-type fan coupling apparatus according to claim 1, wherein said resilient member is formed by a coiled spring.

4. A temperature-responsive fluid fan coupling apparatus according to claim 1, wherein said fixed piece, said pressing piece and said valve piece of said valve member are formed from sheets of material articulated to one another for deflection in response to forces exerted by said at least one spring, said resilient member and said connecting pin, each said sheet of material having a first surface facing said partition plate, a second surface facing away from said partition plate and first and second side edges extending between said surfaces, said at least one spring comprising first and second springs, said first spring extending from said first side edge of said fixed piece to said first side edge of said valve piece, said second spring extending from said second side edge of said fixed piece to said second side edge of said valve piece.

* * * * *

UNITED STATES PATENT AND TRADEMARK OFFICE
CERTIFICATE OF CORRECTION

PATENT NO. : 5,794,749
DATED : April 18, 1998
INVENTOR(S) : Hideo Ryuu

It is certified that error appears in the above-identified patent and that said Letters Patent is hereby corrected as shown below:

On the title page, item [75], the inventor's address should read as follows:
--Tagata-gun, Japan--

Signed and Sealed this

Ninth Day of February, 1999

Attest:

Attesting Officer

Acting Commissioner of Patents and Trademarks